Sept. 24, 1929.   H. P. SLEEPER   1,729,406
PROTECTIVE APPARATUS FOR DISTRIBUTION SYSTEMS
Filed Oct. 21, 1924
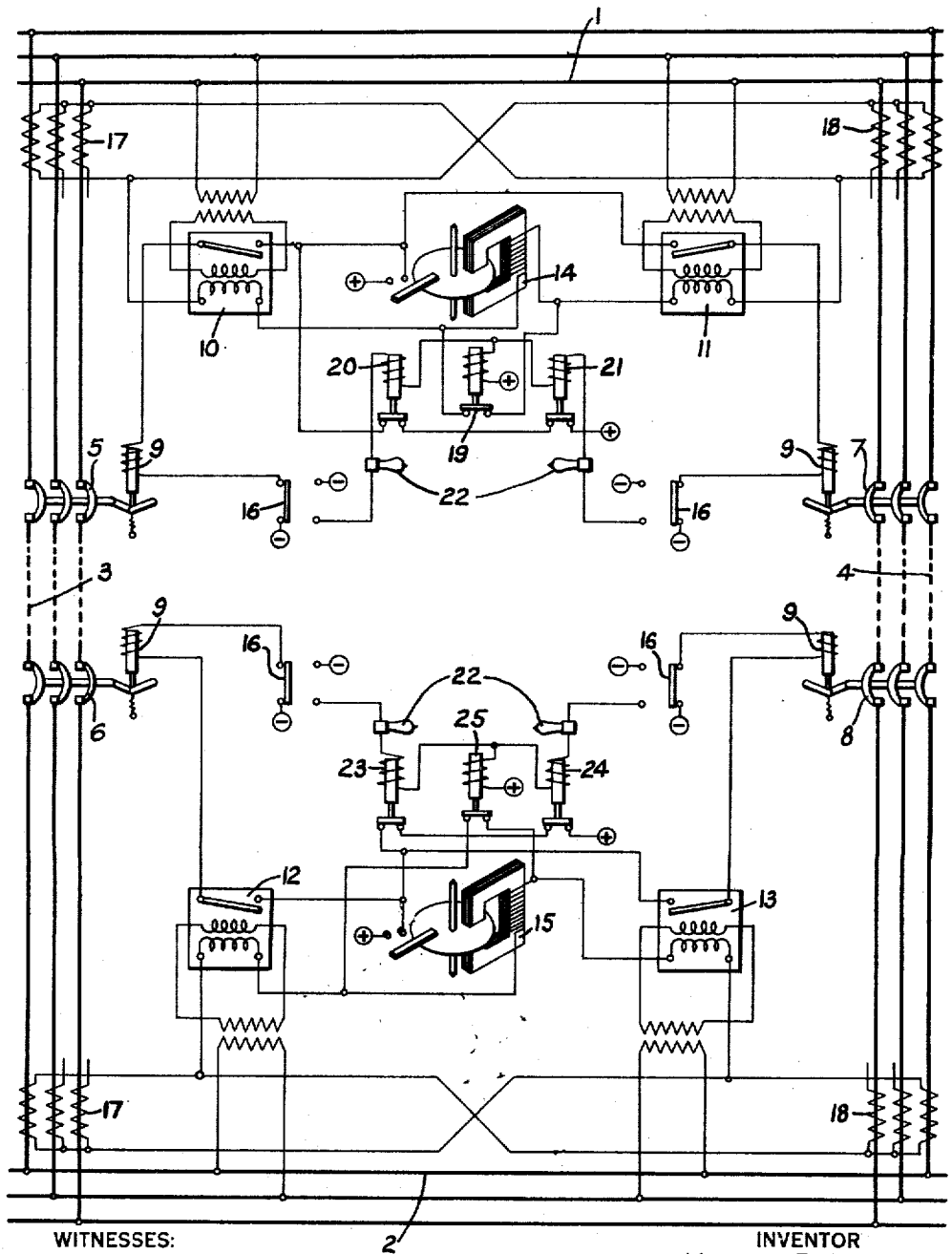
WITNESSES:
R. J. Butler
E. R. Evans
INVENTOR
Harvey P. Sleeper
BY
Chesley G. Carr
ATTORNEY Patented Sept. 24, 1929

1,729,406

UNITED STATES PATENT OFFICE

HARVEY P. SLEEPER, OF EAST PITTSBURGH, PENNSYLVANIA

PROTECTIVE APPARATUS FOR DISTRIBUTION SYSTEMS

Application filed October 21, 1924. Serial No. 745,037.

My invention relates to protective apparatus for distribution systems and particularly to relay protective apparatus for parallel transmission circuits.

The principal object of my invention is to provide relay protective apparatus for a transmission system which functions in different manners according as two or more of the transmission circuits are operated in parallel or the system is operated as a single-line system.

When there are two or more transmission circuits available in a transmission system, it is desirable to disconnect a section of the system, when a fault occurs thereon, as rapidly as possible. But when only one transmission circuit is available, it is desirable to delay the opening of the transmission circuit in case a fault occurs in order to provide time for the disturbance to disappear if the fault is of a temporary nature or is relieved by a circuit-interrupter in another portion of the system. Furthermore, in the case of a ring system, it is desirable to set the relays for different timing periods depending upon the distance of the respective substations from the main generating station in order to disconnect only the section in which the fault occurs.

In accordance with my invention, protective relays are provided to control the circuit-interrupters in the transmission system and the relays are so connected that a defective line is disconnected almost instantaneously upon the occurrence of a fault if two or more parallel circuits are in operation. However, if only one circuit is in operation, a time-element relay is rendered operative to delay the tripping of the circuit-interrupter for a short time in order to provide an opportunity to clear the fault at another point in the system without interrupting the single remaining line.

In parallel-circuit ring systems, it is customary to time all the relays to operate practically instantaneously. Under these conditions, it is obvious that any section operating singly will be disconnected, as well as the faulty section, if a fault has occurred on some other section of the system. This occurrence would interrupt the ring and it is, therefore, essential that this section should not be disconnected if the fault is located at some other point in the system. In the case of a ring system, therefore, the time-element relays are adjusted to permit the selective disconnection of only the faulty section of the transmission circuit. In this way, maximum protection is obtained without sacrificing continuity of service under ordinary conditions.

My invention is, however, not limited to parallel feeder systems, but is generally applicable to circuit-interrupting systems where it is desired to prevent the tripping of an associated circuit-interrupter in case one interrupter is opened upon the occurrence of a fault. Heretofore, it has been the usual practice to accomplish this result by temporarily opening the trip circuit of the associated interrupter. The disadvantage of this arrangement is that a failure to reclose the trip circuit renders the circuit-interrupter non-automatic. In accordance with my invention, the control of the trip circuit is transferred from the instantaneous control relay to a time-element control relay, so that, in case of failure to restore the trip cicruit to the instantaneous control relay, the circuit-interrupter remains under the control of the time-element relay and is not rendered non-automatic.

Since circuit-interrupters are ordinarily provided with interlocking contact members for controlling signal or supervisory lamps on the switchboard, I prefer to utilize this interlocking circuit to modify the operating characteristic of the relay system automatically in case only one of the transmission circuits is in operation.

In the accompanying drawings, the single figure is a diagrammatic view of a distribution system comprising two parallel transmission circuits to which my invention is applied.

Referring to the drawing bus-bars 1 and 2 are located in a main generating station and a substation, respectively, and are connected by two parallel transmission circuits 3 and 4 extending between the stations. Circuit-interrupters 5, 6, 7 and 8 are respectively interposed between the bus-bars and the corresponding transmission circuit in each of the stations. The circuit-interrupters are provided with trip coils 9, the energization of which is controlled by power-directional relays 10, 11, 12 and 13, and time-element relays 14 and 15. Interlock contact members 16 are associated with each circuit-interrupter and change position when the circuit-interrupter operates. In other words, the circuit-interrupter is arranged to open the contact members 16 that are shown closed and to close the contact members that are shown open when the circuit-interrupter opens. The interlock contact members 16 are used to control signal lamps 22 on the switchboard adjacent the relays to indicate the position of the circuit-interrupters.

A current transformer 17 is connected in each conductor of the transmission circuit, and corresponding transformers 18 in the parallel transmission circuits have their secondary windings connected in opposition to the secondary windings of the transformers 17, as shown. The current windings of the relays 10 to 15, inclusive, are energized by the current traversing the circuit connecting the differentially-connected current transformers 17 and 18. In the case of balanced loads on the two parallel transmission circuits, the terminal potentials of the current transformers 17 and 18 are equal and opposite, and no current traverses the current windings of the relays 10 to 15, inclusive.

Relays 19, 20 and 21 are controlled by the interlock contacts 16. The contacts of the relay 19 normally short-circuit the winding of the relay 14. Relays 20 and 21 cooperate with the power-directional relays 10 and 11 to control the circuit of the trip coils 9 of the circuit-interrupters 5 and 7. The circuit-interrupters 6 and 8, at the opposite end of the section are similarly controlled by the relays 12, 13, 15, 23, 24 and 25.

The power-directional relays 10 to 13, inclusive, are preferably of the wattmeter type but any relay that is responsive to a reversal of the flow of energy may be used. The relays 14 and 15 are shown as of the induction type and preferably have a definite-time characteristic but any retarded relay may be used that is sufficiently accurate with respect to the time of operation.

The operation of the system is as follows:
Assume that the circuit-interrupters 5, 6, 7 and 8 are closed and power is traversing both the parallel circuits 3 and 4. In case a short-circuit occurs in the feeder 3, the currents traversing the transformers 17 and 18 in the main station become unequal and a current flows through the relays 10 and 11. Since the fault is in the circuit 3, the relay 10 is energized in such direction as to close its contacts, and the relay 11 is energized in the opposite direction. Since service may be maintained and the load on the system carried by the parallel circuit 4, it is preferable to disconnect the short-circuited feeder quickly. Accordingly, the relay 10 is adjusted to close its contacts without any retardation, and the circuit-interrupter 5 is tripped, disconnecting the feeder 3 substantially instantaneously. The circuit for tripping the circuit-interrupter 5 may be traced from battery through the contact members of the relays 21, 20 and 10 in series, the trip coil 9 and the interlock contact members 16 to battery.

When the circuit-interrupter 5 has been operated, the interlock contact members 16 are actuated, and a circuit is closed through these contact members for energizing relays 19 and 20. Relay 19 opens the short-circuit across the winding of relay 14, and relay 20 interrupts the battery connection to the contact members of the relays 10 and 11.

The circuit-interrupter 6 in the substation is tripped to disconnect the faulty transmission circuit 3 from the bus-bars 2 at substantially the same instant as the circuit-interrupter 5 is tripped, the operation of the relays being similar to that described above. After the circuit-interrupter 5 has tripped, the power-directional relay 11 will be energized because of the unbalance between the transformers 17 and 18 unless the circuit-interrupter 6 is tripped immediately.

Even if sufficient time elapses after the operation of the interrupter 5 for the relay 11 to operate, however, the circuit-interrupter 7 will not be tripped because the tripping circuit is opened by relay 20. Since the relay 14 is retarded in its operation, ample time is provided for tripping the interrupter 6, thereby ensuring against disconnection of the feeder 4. If the relays associated with the circuit-interrupter 6 fail to function properly, the circuit-interrupter 7 will be tripped by the relay 14 in conjunction with relay 11, and the circuit 2 disconnected from the generating station. However, this condition will only occur in the event that the relays in the substation fail to operate.

The system is now operating with the single transmission circuit 4 connecting the bus-bars 1 and 2. It will be understood that the line section shown may be only a part of a distribution system which comprises a number of similar line sections in series. In some cases these sections will be connected in the form of a ring. In such cases, when any one section thereof is operating as a single-line system, it is desirable to adjust the timing of the protective relays controlling the circuit-breakers in order to provide maximum continuity of service by interrupting the circuit only when absolutely necessary and then by disconnecting only the defective section.

Thus, if the operation of the relay controlling the interrupters 7 and 8 is retarded, some of the faults that occur on the system will be cleared in some other manner before the relay trips the circuit-interrupters. For instance, this may be accomplished by the disconnection of another section of the system. Furthermore, in a ring system it is desirable to adjust the protective relays with varying time periods, depending upon the distance from the generating station, to secure selective action of the relays in accordance with the location of a faulty section. This is possible in the system shown without sacrificing the advantages of instantaneous disconnection of the faulty feeder where two or more feeders are operating in parallel.

Assuming, therefore, that the circuit-interrupters 5 and 6 are open and the circuit-interrupters 7 and 8 are closed, so that only one transmission circuit connects the bus-bars 1 and 2, it is apparent that relays 19 and 20 are energized as described above. The relay 19 renders the relay 14 operative, and the relay 20 disconnects the battery from the contact members of the relay 11. In the case of a short-circuit upon the transmission circuit 4 or upon the system at some other point which produces an excessive current in the circuit 4, the relay 14 will be energized. After a predetermined time which depends upon the adjustment of the relay 14, the relay closes its contact members and trips the circuit-interrupter 7, the tripping circuit including the contact members of the power-directional relay 11 and the interlocking contact members 16. The relays, such as 14 and 15, on other sections of the ring are so adjusted in accordance with the distance of the section from the generating station that selective disconnection of a faulty section is obtained.

The selective adjustment of relays 14 and 15 and the control of these relays by the circuit-breaker interlock contact members 16 permit operation of the system either as a parallel-circuit system or a single-circuit system with the usual protection for either case. Since the relays 14 and 15 are automatically rendered operative when either of the associated circuit-interrupters is open, the control of the system is simple and the operation of the relays is automatically modified in accordance with the existing conditions without any attention from the operator. Since relays 19, 20 and 21 are in the circuits of the pilot lamps 22, no additional circuit is required from the circuit-breakers to the switchboard.

The relay 19 controlling the change in the characteristics of the system is normally deenergized and closes, through its back contacts, a shunt circuit across the operating coil of relay 14. Therefore, if relay 19 fails to operate or to reset after operating, the protective relays would not fail to trip the associated circuit-interrupters but the time of operation would be changed. The additional function of the relay 19 is obtained without increasing the chances of failure in case one of the control relays does not function properly. Relays 20 and 21 are also normally deenergized in order to provide as great a factor of safety in their operation as possible.

As many changes may be made in the system shown and described in the foregoing specification within the spirit of my invention, I do not wish it to be limited in scope except as limitations may be imposed by the appended claims.

I claim as my invention:

1. An electrical system of distribution comprising two parallel transmission circuits, circuit-interrupters at the ends of the sections thereof, balanced relays controlling said circuit-interrupters to provide selective protection against faults in said circuit when connected in parallel and means including other relays rendered effective after the opening of the interrupters of one circuit to control said circuit-interrupters to provide selective protection of the single line sections of said system.

2. An electrical system of distribution comprising parallel transmission circuits, circuit-interrupters at the ends thereof, time-element relays for controlling the circuit-interrupters to provide protection against faults on said circuits and means for rendering said relays non-operative except when certain of said circuit-interrupters are open.

3. An electrical system of distribution comprising bus-bars, two parallel feeders connected thereto, two circuit-interrupters between said feeders and bus-bars, a time-element relay controlling both of said circuit-interrupters and connected to said feeders, and means for rendering said relay non-operative except when either one of said interrupters is open.

4. An electrical system of distribution comprising two parallel feeders, a circuit-interrupter at each end of each of said feeders, balanced relays at each end of said feeders, each of said relays controlling one of said circuit-interrupters when both said feeders are in use, a time-element relay at each end of said feeders for controlling said circuit-interrupters, and means for automatically rendering said time-element relays operative only as long as either of said feeders is disconnected.

5. An electrical system of distribution comprising two transmission circuits, two relays having different time characteristics connected to one of said circuits and means for controlling the operativeness of one of said relays whenever the other of said circuits is disconnected from the system.

6. An electrical system of distribution comprising two transmission circuits, two relays having different time characteristics connected to one of said circuits, a circuit-interrupter in said one of said circuits and controlled by said relays and means for rendering one of said relays non-operative when the other of said circuits is connected to the system.

7. An electrical system of distribution comprising parallel transmission circuits, circuit-interrupters therein provided with interlock contact members, means including a time-element relay for controlling said circuit-interrupters, an auxiliary relay controlling a shunt circuit around said time-element relay and means including certain of said interlock contact members for energizing said auxiliary relay when one of the circuit-interrupters is operated.

8. An electrical system of distribution comprising two parallel feeder circuits, a circuit interrupter at each end of each feeder circuit, current transformers for each phase at each end of each circuit, means connecting corresponding phase transformers in circuit, two directional relays connected to said transformer circuit and each respectively operative to control one of the interrupters associated therewith, and a time-element relay energized from said transformer circuit and operative after the actuation of either interrupter, by its associated directional relay, to cooperate with the directional relay of the other interrupter to provide a long-time element in the control of that interrupter.

9. In an electrical system, the combination with two parallel circuits each provided with an interrupter, of means for selectively controlling them, upon the occurrence of a fault in either circuit, to operate the interrupter in the faulty circuit in a relatively short interval after the occurrence of the fault and to then provide a relatively long interval in the protective control of the other interrupter, said means comprising a directional relay for each interrupter and a time-element relay cooperative, after the operation of one interrupter, with the directional relay of the other interrupter to control that interrupter.

10. In an electrical system, the combination with two parallel circuits and interrupters therefor, of directional relays for selectively controlling the interrupters to quickly actuate either circuit interrupter upon the occurrence of a faulty condition in the associated circuit, and a long-time-element current relay then effective after such actuation to assist in controlling the other interrupter.

11. In an electrical system, the combination with two circuits each provided with an interrupter, of selective relay elements arranged to selectively actuate either interrupter, said elements comprising two switch devices having an electrically common terminal, and a current-relay element embodying a switch connected to said common terminal to permit the current relay to cooperate with either selective element and means for limiting the effectiveness of the current relay while both circuit interrupters are closed.

In testimony whereof, I have hereunto subscribed my name this ninth day of October, 1924.

HARVEY P. SLEEPER.